United States Patent
Su et al.

(10) Patent No.: US 7,844,236 B1
(45) Date of Patent: Nov. 30, 2010

(54) APPARATUS AND METHOD FOR ENABLING AN ADAPTATION UNIT TO BE SHARED AMONG A PLURALITY OF RECEIVERS

(75) Inventors: Jianghui Su, San Jose, CA (US); Quang H. Trang, Cupertino, CA (US); Dawei Huang, San Diego, CA (US)

(73) Assignee: Oracle America, Inc., Redwood City, CA (US)

( * ) Notice: Subject to any disclaimer, the term of this patent is extended or adjusted under 35 U.S.C. 154(b) by 563 days.

(21) Appl. No.: 11/963,632

(22) Filed: Dec. 21, 2007

(51) Int. Cl.
*H04B 7/08* (2006.01)

(52) U.S. Cl. .................. 455/132; 455/557; 375/316

(58) Field of Classification Search .................. 455/132, 455/140, 141, 333, 344, 347, 348, 349, 557; 375/316
See application file for complete search history.

(56) References Cited

U.S. PATENT DOCUMENTS 4,584,690 A * 4/1986 Cafiero et al. ............... 375/317
6,665,351 B2 * 12/2003 Hedberg ..................... 375/296
6,895,062 B1 * 5/2005 Wilson ....................... 375/316

OTHER PUBLICATIONS

Harwood, Mike, et al., "A 12.5 Gb/s SerDes in 65nm CMOS Using a Baud-Rate ADC with Digital Receiver Equalization and Clock Recovery", IEEE International Solid-State Circuits Conference, 2007, 10 pages.

* cited by examiner

*Primary Examiner*—Quochien B Vuong
(74) *Attorney, Agent, or Firm*—Osha • Liang LLP (57) ABSTRACT

An apparatus and method are provided to enable an adaptation unit to be shared among a plurality of receivers. The adaptation unit provides compensation values to each receiver to enable each receiver to compensate for the pulse response effect experienced by that receiver. By sharing an adaptation unit among a plurality of receivers rather than having a dedicated adaptation unit for each receiver, the chip space needed is significantly reduced since the number of adaptation units that need to be implemented is significantly reduced. In addition, the fewer number of adaptation units leads to less power consumption during operation. Overall, the sharing of the adaptation unit enables greater efficiency and improved scalability to be achieved.

20 Claims, 4 Drawing Sheets

APPARATUS AND METHOD FOR ENABLING AN ADAPTATION UNIT TO BE SHARED AMONG A PLURALITY OF RECEIVERS

BACKGROUND

In many of today's integrated circuits (IC's), serializer/deserializer (SerDes) circuits are implemented to enable the IC's to exchange information with each other and with other components at very high data rates. The SerDes circuits include a transmitter and a receiver. Typically, information is sent from a transmitter on one IC to a receiver on another IC through a series of analog pulses. Specifically, to send a digital bit of information, a transmitter determines whether the bit that it wants to send is a digital 1 or a digital 0. If the bit is a digital 1, the transmitter generates an analog signal (which may be made up of a single signal or a pair of differential signals) having a positive voltage. If the bit is a digital 0, the transmitter generates an analog signal having a negative voltage. After generating the analog signal, the transmitter sends the analog signal as a pulse having a certain duration to the receiver along a communications link. Upon receiving the analog signal, the receiver determines whether the analog signal has a positive voltage or a negative voltage. If the voltage is positive, the receiver determines that the analog signal represents a digital 1. If the voltage is negative, the receiver determines that the analog signal represents a digital 0. In this manner, the transmitter is able to provide digital information to the receiver using analog signals.

Ideally, the receiver should receive analog pulses that closely resemble the analog pulses that were sent by the transmitter. Unfortunately, due to a pulse response effect that is experienced at high data rates, this ideal cannot be achieved. In fact, the analog signal that is received by the receiver often differs from the pulse that was sent by the transmitter by such a degree that it is often difficult for the receiver to determine whether the received analog signal represents a digital 1 or a digital 0.

Figure 1:
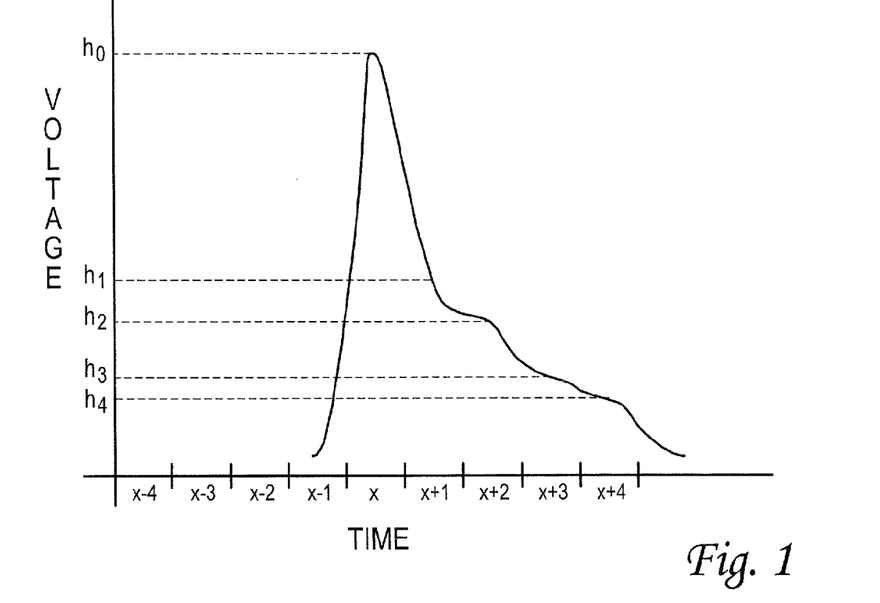
FIG. 1 shows a sample pulse response for a positive-voltage pulse.

To elaborate upon the concept of a pulse response, reference will be made to the sample pulse response shown in FIG. 1. FIG. 1 shows an example of what may be received by a receiver in response to a single positive-voltage pulse (representing a digital 1) sent by the transmitter. In the example shown in FIG. 1, the pulse is sent by the transmitter in time interval x−4 and received by the receiver four time intervals later beginning with time interval x. Notice that even though the transmitter sent a pulse lasting only a single time interval, the receiver does not receive that pulse in just a single time interval. Instead, the receiver receives an analog signal that lasts for several time intervals. During time interval x, the received signal has a magnitude of h0. During the next time interval (interval x+1), the received signal still has a magnitude of h1. During the next several time intervals, the received signal still has magnitudes of h2, h3, h4, and so on. Thus, even though the transmitter sent a pulse lasting only one time interval, the receiver receives a signal that lasts for many time intervals.

Because of this pulse response effect, a pulse sent in one time interval affects pulses sent in future time intervals. To illustrate, suppose that the transmitter sends another positive-voltage pulse in time interval x−3, and that this pulse is received by the receiver beginning in time interval x+1. During time interval x+1, the receiver would sense the h0 voltage of the pulse sent in time interval x−3. The receiver would also sense the h1 voltage of the pulse previously sent in time interval x−4. Suppose further that the transmitter sends another positive-voltage pulse in time interval x−2, and that this pulse is received by the receiver beginning in time interval x+2. During time interval x+2, the receiver would sense the h0 voltage of the pulse sent in time interval x−2. The receiver would also sense the h1 voltage of the pulse previously sent in time interval x−3. In addition, the receiver would sense the h2 voltage of the pulse previously sent in time interval x−4. Thus, the voltage sensed by the receiver at time interval x+2 is an accumulation of the effects of the pulses sent at time intervals x−4, x−3, and x−2 (and even pulses sent at time intervals before x−4). As this example shows, when the receiver senses a voltage during a time interval, it does not sense the effect of just one pulse but the accumulation of the effects of multiple pulses.

Figure 2:
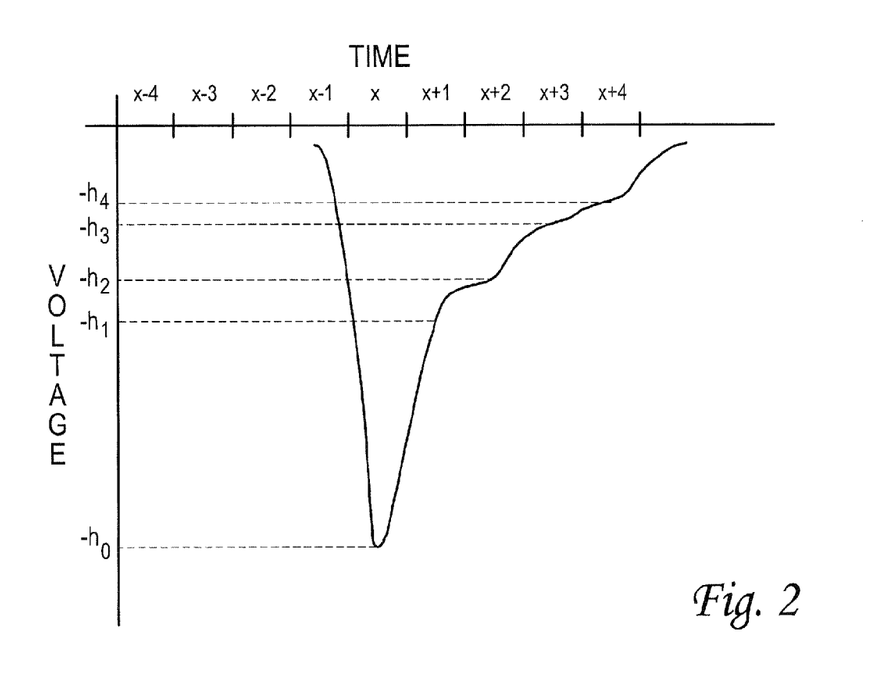
FIG. 2 shows a sample pulse response for a negative-voltage pulse.

FIG. 1 shows the pulse response for a single positive-voltage pulse. The pulse response for a single negative-voltage pulse (representing a digital 0) is shown in FIG. 2. Notice that the pulse response of FIG. 2 is similar to the pulse response of FIG. 1 except that the voltages are negative instead of positive. Thus, as shown by FIGS. 1 and 2, the effect that a pulse has on future pulses will depend on whether that pulse is a positive-voltage pulse (representing a digital 1) or a negative-voltage pulse (representing a digital 0). If a pulse is a positive-voltage pulse, it will add to the voltages of future pulses. Conversely, if the pulse is a negative-voltage pulse, it will subtract from the voltages of future pulses.

As noted above, when the receiver senses a voltage during a time interval, it does not sense the effect of just one pulse but the accumulation of the effects of multiple pulses. That being the case, the receiver should not determine whether a digital 1 or digital 0 was sent based solely upon the voltage that it senses during a time interval. That may yield incorrect results as the effects of previously sent pulses may make a currently sensed voltage come very close to zero volts (or worse yet, may turn a positive voltage into a negative one or vice versa). Instead, the receiver should try to compensate for (i.e. remove) the effects of previously sent pulses to derive a compensated voltage, and then determine whether a digital 1 or digital 0 was sent based upon the compensated voltage. That way, a more accurate determination can be made.

To compensate for the effects of previously sent pulses, a receiver may convert an analog signal received during a current time interval into a corresponding digital value representative of the voltage of the analog signal. The receiver may then subtract a digital compensation value (which represents an approximation of the effects of previously sent pulses) from the corresponding digital value to derive a digital compensated value. The compensated value, which is a digital representation of the analog signal with the effects of previously sent pulses removed, is then compared against a digital reference value (e.g. a digital representation of zero volts). If the compensated value is greater than the reference value, then the receiver concludes that a digital 1 was sent. If the compensated value is less than the reference value, then the receiver concludes that a digital 0 was sent.

As noted above, the compensation value represents an approximation of the effects of previously sent pulses. In order to know what this compensation value should be, the receiver has to know what series of pulses (positive-voltage pulses and negative-voltage pulses) were sent prior to a currently sensed voltage. This is because different series of pulses will have different effects on a currently sensed voltage. For example, five previously sent pulses having four positive-voltage pulses followed by one negative-voltage pulse will have a different effect on a currently sensed voltage than five previously sent pulses having four negative-voltage pulses followed by one positive-voltage pulse.

To keep track of what pulses were previously sent, the receiver maintains an m number of "history bits". These history bits reflect the last m bits that were received by the receiver, and provide an indication as to what types of pulses were previously sent. For example, suppose that m is five, and that the last five bits received by the receiver were 10010 (where the most significant bit is the most recently received bit). This would mean that the receiver received a digital 1 in the time interval preceding the current time interval, a digital 0 two time intervals before the current time interval, a digital 0 three time intervals before the current time interval, a digital 1 four time intervals before the current time interval, and a digital 0 five time intervals before the current time interval. Because a digital 1 means that a positive-voltage pulse was sent and a digital 0 means that a negative-voltage pulse was sent, this series 10010 of history bits would mean that the sequence of previously sent pulses was: a negative-voltage pulse, followed by a positive-voltage pulse, followed by a negative-voltage pulse, followed by a negative-voltage pulse, followed by a positive-voltage pulse.

The receiver may maintain the various digital compensation values in a memory. This memory would contain a compensation value for each possible series or combination of history bits (the terms "series of history bits" and "combination of history bits" may be used interchangeably hereinafter). For example, if five history bits are maintained, then the memory would contain $2^5$ or 32 compensation values, with each compensation value corresponding to a particular combination of the five history bits. The memory may be set up such that the history bits may be used as address bits to access a particular compensation value corresponding to a particular combination of history bits. For example, if the history bits are 10010, then 10010 may be applied as address bits to the memory to access location 10010 which would contain the compensation value corresponding to history bits 10010. Set up in this manner, the compensation values can be accessed quickly and easily based upon the history bits.

The compensation values stored in the memory may be provided by an adaptation unit. The adaptation unit interacts with the receiver to iteratively receive error information pertaining to the compensation values, make determinations as to whether certain compensation values corresponding to certain combinations of history bits should be adjusted, and then adjust the compensation values stored in the memory. This iterative process carried out by the adaptation unit will cause the compensation values in the memory to eventually converge to a set of stable values. Once the compensation values converge, they reflect the proper values that should be used to compensate for the effects of previously sent pulses for each possible combination of history bits. Even after the compensation values converge, the adaptation unit continues to interact with the receiver to continually adjust the compensation values, as needed. That way, the receiver and adaptation unit can adjust dynamically to changes.

Ultimately, the compensation values enable a receiver to compensate for the pulse response effect experienced by that receiver. The pulse response characterizes the link performance (i.e. the behavior) of the link to which the receiver is coupled. Because the behavior of each link is different, different receivers coupled to different links will experience different pulse response effects. For example, a first receiver coupled to a first link will experience a different pulse response effect than a second receiver coupled to a second link. Because of this, each receiver stores a different set of compensation values, with each set of compensation values customized for the link to which that receiver is coupled. Because customized compensation values are needed for each receiver, and because the compensation values are provided by an adaptation unit, an adaptation unit is dedicated to each receiver. That adaptation unit is responsible for providing and maintaining the compensation values for that receiver.

In a large scale IC (e.g. a microprocessor), there can be a very large number of SerDes receivers implemented on the IC to enable it to effect high speed communication with other components. Currently, each receiver/adaptation unit combination consumes significant chip space and power. Because of this, the current architecture does not scale well.

SUMMARY

In accordance with one embodiment of the present invention, an apparatus and method are provided to enable an adaptation unit to be shared among a plurality of receivers. By sharing an adaptation unit among a plurality of receivers, the chip space needed is significantly reduced since the number of adaptation units that need to be implemented is significantly reduced. In addition, the fewer number of adaptation units leads to less power consumption during operation. Overall, this embodiment of the present invention enables greater efficiency and improved scalability to be achieved.

In one embodiment, the apparatus comprises an n number of receivers (where n is an integer greater than 1) with each receiver coupled to a separate communications link. Each receiver comprises means for storing a plurality of compensation values, with each compensation value corresponding to a particular combination of history bits. The apparatus further comprises a shared adaptation unit (SAU), and an interconnect for selectively coupling the SAU to each of the n receivers. In one embodiment, the interconnect selectively couples the SAU to each of the n receivers to enable the SAU to be shared by the n receivers. When the interconnect couples the SAU to a receiver, that receiver becomes the currently coupled receiver.

The SAU comprises means for interacting with a currently coupled receiver to adjust the compensation values stored by that receiver. By adjusting the compensation values, the SAU is able to customize the compensation values stored by the currently coupled receiver for the communications link to which the currently coupled receiver is coupled. By coupling the SAU to each receiver, and by having the SAU adjust the compensation values stored by each receiver, the apparatus is able to provide compensation values to each receiver without requiring an adaptation unit to be dedicated to each receiver.

DETAILED DESCRIPTION OF EMBODIMENT(S)

Overview

Figure 3:
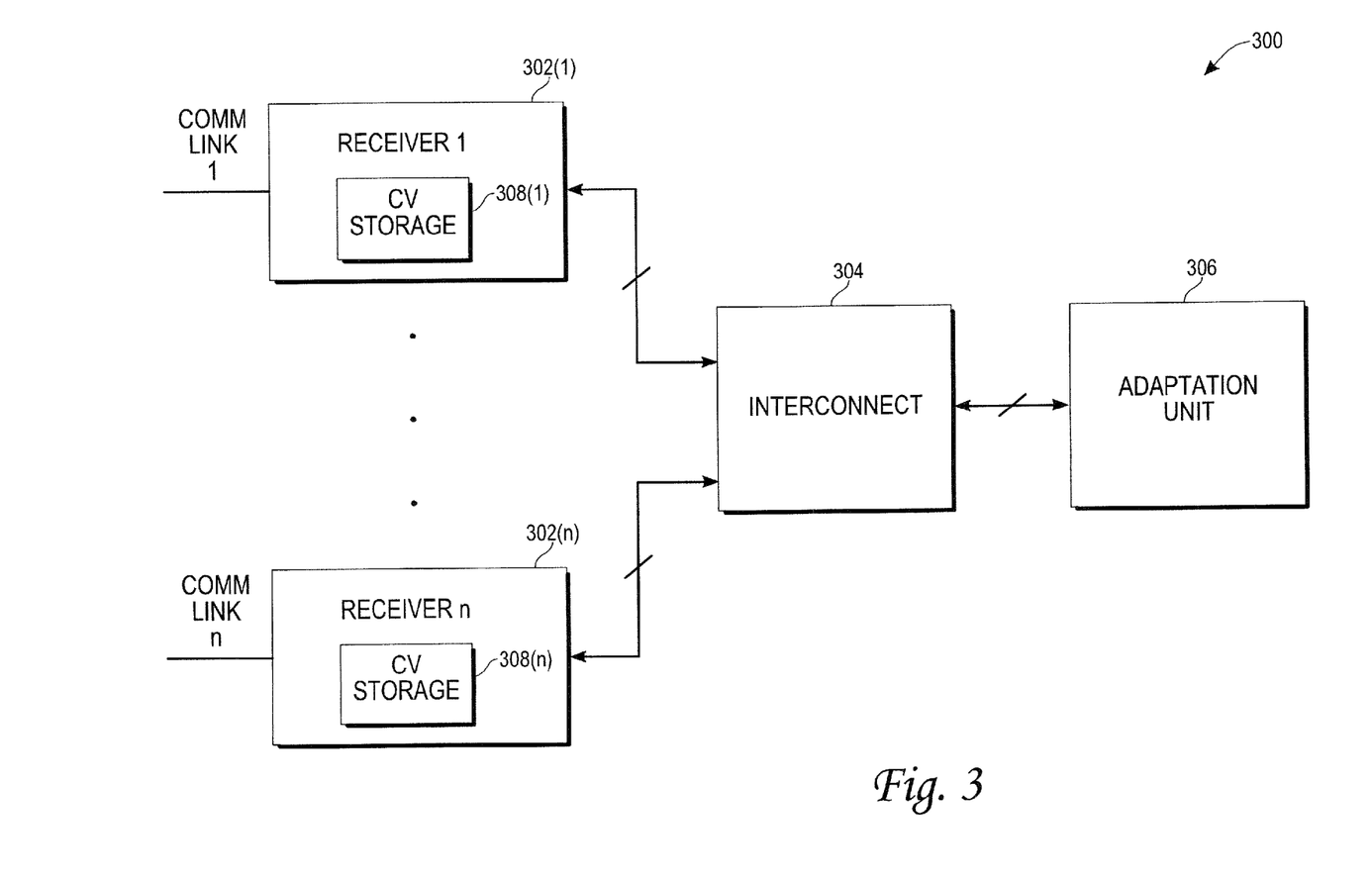
FIG. 3 shows an apparatus comprising a plurality of receivers, an interconnect, and a shared adaptation unit, in accordance with one embodiment of the present invention.

FIG. 3 shows an overview of an apparatus 300 in accordance with one embodiment of the present invention. The apparatus 300 of FIG. 3 enables a single adaptation unit to be shared among a plurality of receivers. The apparatus 300 comprises an n number of receivers 302(1)-302(n) (where n is an integer greater than one), an interconnect 304, and an adaptation unit 306. In one embodiment, n is between 7 and 14, inclusive; thus, the apparatus 300 enables the adaptation unit 306 to be shared among a relatively large number of receivers 302. For purposes of the present invention, the adaptation unit 306 may be shared among any desired number of receivers 302 (i.e. n is not limited to being between 7 and 14, inclusive). One or more instances of apparatus 300 may be implemented on a single IC.

Each receiver 302 is coupled to a separate communications link. A communications link may be a physical link (e.g. wire, conductive lead, bus line, etc.) or a wireless link. The communications link allows a receiver 302 to receive analog signals from a corresponding transmitter (not shown).

Each receiver 302 comprises a compensation value (CV) storage 308. Each CV storage 308(1)-308(n) stores digital compensation values that allow a receiver to compensate for the effects of previously sent pulses. Each compensation value corresponds to a particular combination of history bits. The compensation values will be elaborated upon in a later section, but suffice it to say at this point that the compensation values stored by each receiver 302 are, at some point, customized to reflect the pulse response behavior of the communications link to which that receiver is coupled. Thus, each receiver 302 may store a different set of compensation values. For purposes of the present invention, the CV storage 308 may be implemented using any type of desired storage (e.g. memory, random access memory, flash memory, EEPROM, magnetic media, etc.).

Each receiver 302 is coupled to the interconnect 304. The adaptation unit 306 is also coupled to the interconnect 304. In one embodiment, the interconnect 304 selectively couples the adaptation unit 306 to each of the n receivers 302. This enables the receivers 302 to share the adaptation unit 306. When a receiver 302 is coupled to the adaptation unit 306, it becomes the currently coupled receiver. The interconnect 304 operates in such a manner that, at some point, each of the n receivers 302 will become the currently coupled receiver; thus, each of the receivers 302 will get access to the adaptation unit 306.

The interconnect 304 may couple the adaptation unit 306 to the receivers 302 according to any desired sharing scheme. For example, the interconnect 304 may implement a round robin, equal time sharing scheme in which the interconnect 304 couples the adaptation unit 306 to each of the receivers 302 one after the other with each receiver 302 getting the same amount of time with the adaptation unit 306. As an alternative, the interconnect 304 may implement a weighted sharing scheme in which certain receivers 302 are given more time with the adaptation unit 306 than others. As a further alternative, the interconnect 304 may couple the adaptation unit 306 to each receiver 302 based upon priority of the receivers rather than in a round robin fashion. As yet another alternative, the interconnect 304 may couple the adaptation unit 306 to the receivers 302 in response to instructions from the adaptation unit 306 (that way, the adaptation unit 306 can stay coupled to a receiver 302 until the adaptation unit 306 determines that the compensation values for that receiver have converged to a satisfactory degree). The interconnect 304 may implement these and other sharing schemes (and/or combinations thereof). All such sharing schemes are within the scope of the present invention. For purposes of the present invention, the interconnect 304 may be implemented using any desired technology. For example, the interconnect 304 may be implemented using one or more multiplexers/demultiplexers controlled by clock and select signals. The interconnect 304 may also be implemented using a crossbar interconnect, or one or more switches. These and many other technologies may be used to implement the interconnect 304 within the scope of the present invention.

When the adaptation unit 306 is coupled to one of the receivers 302, it interacts with that receiver to iteratively adjust the compensation values stored in the CV storage 308 of that receiver 302. The operation of the adaptation unit 306 will be elaborated upon in a later section, but suffice it to say at this point that the adaptation unit 306 will cause the compensation values stored by a receiver 302 to be customized for the communications link to which that receiver 302 is coupled to compensate for the pulse response effect experienced on that communications link.

Before the compensation values in the CV storages 308 of the receivers 302 can be reliably used to compensate for the pulse response effects of the respective communications links, the compensation values first have to be initialized. To initialize each set of compensation values, the interconnect 304, at startup, can couple the adaptation unit 306 to each of the receivers 302 in turn to allow the adaptation unit 306 to adjust and customize the compensation values for each of the various receivers 302. For example, the interconnect 304 can couple a first receiver (e.g. receiver 1) to the adaptation unit 306 to let the adaptation unit 306 adjust the compensation values stored by that receiver, then couple a second receiver to the adaptation unit 306 to let the adaptation unit 306 adjust the compensation values stored by that receiver, and continue this process until all of the compensation values for all of the receivers have been initialized. A problem with this approach is that the last receiver (e.g. receiver n) that is coupled to the adaptation unit 306 will not be initialized until quite some time after the first receiver has been initialized. In some implementations, this delay cannot be tolerated (or at least is undesirable).

To hasten the initialization of the compensation values for the various receivers 302, a special initialization procedure may be implemented at startup. To illustrate this procedure, reference will be made to an example. Suppose that at startup, the first receiver to be coupled by the interconnect 304 to the adaptation unit 306 is receiver 1 302(1). While it is coupled to receiver 302(1), the adaptation unit 306 interacts with receiver 302(1) to iteratively adjust the compensation values stored in CV storage 308(1). As part of the adjustment process, the adaptation unit 306 will send a plurality of instructions to the receiver 302(1) to tell the receiver 302(1) to update a plurality of compensation values. Each instruction will include an updated compensation value and a set of history bits corresponding to the updated compensation value. In one embodiment, each time such an instruction is sent to the receiver 302(1), that same instruction is also broadcasted to all of the other receivers. The interconnect 304 has such a broadcasting capability, and this capability may be invoked by the adaptation unit 306, or it may be automatically enabled during a startup/initialization phase. In response to each instruction, each of the receivers 302 will update its CV storage 308 accordingly. Thus, as receiver 302(1) is being initialized, all of the other receivers are also initialized with the same compensation values as receiver 302(1). By implementing this broadcasting procedure, all of the receivers are initialized much more quickly.

With the above broadcasting approach, all of the receivers other than receiver 302(1) will be initialized with compensation values that are not customized for the communications link to which that receiver is coupled. While these compensation values are not optimal for steady state operation, they are sufficient for initialization purposes. It has been observed by Applicants that, while link behavior and pulse response effect do differ from link to link, they often do not differ greatly. Thus, even though these compensation values were customized for the communications link coupled to receiver 302(1), they still serve as good estimates for the communications links coupled to the other receivers. Besides, after the interconnect 304 couples the adaptation unit 306 to receiver 302(1), it will couple the adaptation unit 306 to each of the other receivers as well. Thus, the compensation values stored by each of the other receivers will eventually be customized by the adaptation unit 306 for the communications link to which that receiver is coupled (note: after all of the receivers are initialized with the compensation values of receiver 302(1), the interconnect 304 no longer operates in broadcast mode).

The above discussion provides an overview of one embodiment of the present invention. The following sections will describe the embodiment in greater detail.

Receiver

Figure 4:
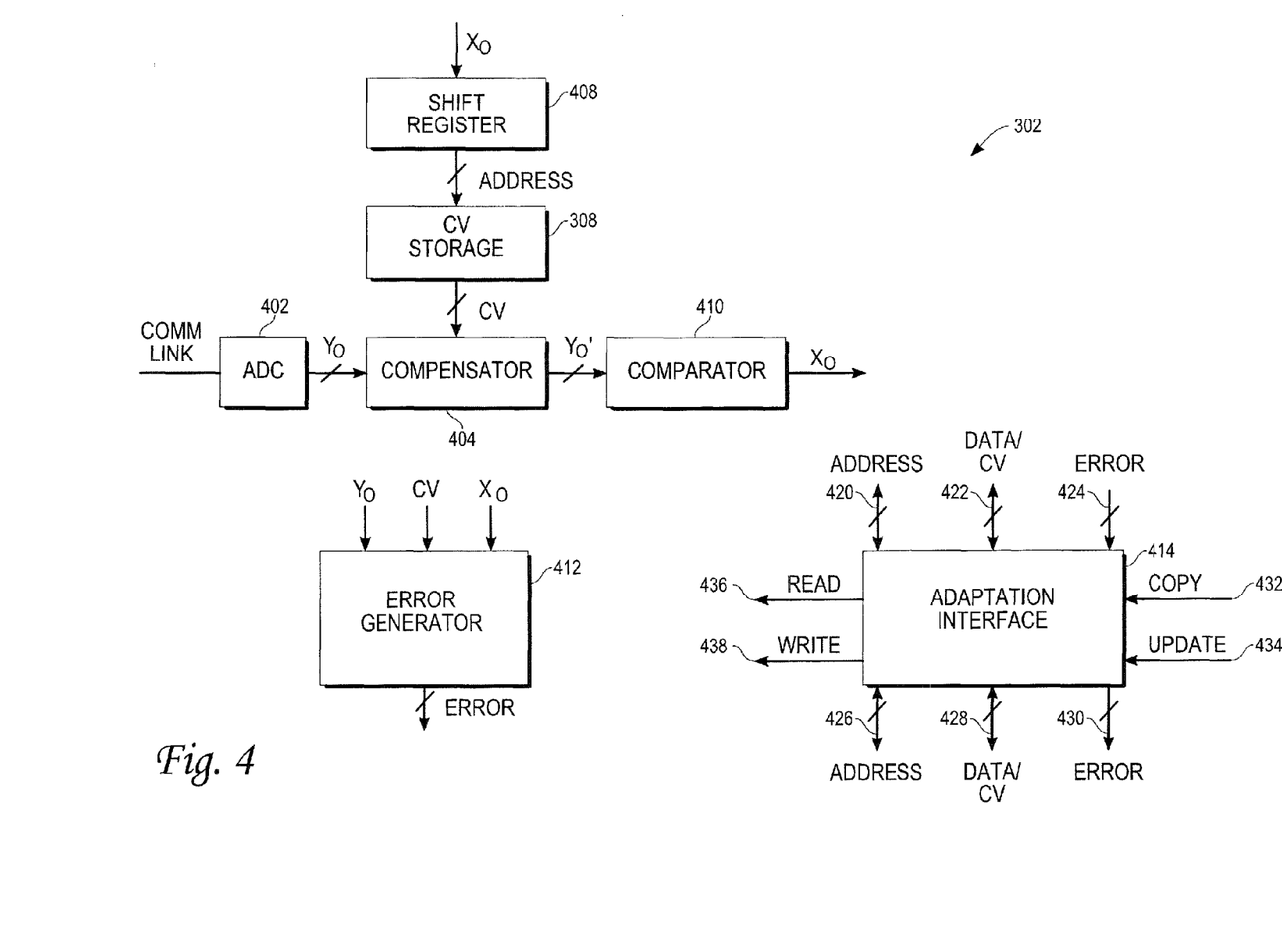
FIG. 4 shows a receiver, in accordance with one embodiment of the present invention.

FIG. 4 shows a receiver 302 in accordance with one embodiment of the present invention. In one embodiment, each of the receivers 302(1)-302(n) in FIG. 3 is constructed as shown in FIG. 4. As shown, a receiver 302 comprises an analog-to-digital converter (ADC) 402, which is coupled to a communications link to receive analog signals. During each time interval, an incoming analog signal is sampled to obtain a sampled voltage. The ADC 402 then converts the sampled voltage into a digital value $y_o$ that is representative of the sampled voltage. In one embodiment, $y_o$ is a four-bit digital value, but if so desired, the ADC 402 may have a different resolution and provide a different number of bits for $y_o$. The digital value $y_o$ is thereafter provided to a compensator 404.

In one embodiment, it is the compensator 404 that is responsible for processing the digital value $y_o$ to remove therefrom the effects or contributions of previously sent pulses. In one embodiment, the compensator 404 does so by receiving a digital compensation value (CV) (which represents an approximation of the effects of previously sent pulses) from a CV storage 308, and subtracting the compensation value from the digital value $y_o$ to derive a compensated value $y_o'$. The compensated value $y_o'$, which is a digital representation of the sampled voltage with the effects of previously sent pulses removed, is then provided to a comparator 410.

The comparator 410 compares the compensated value $y_o'$ with a digital reference value (e.g. a digital representation of zero volts). If $y_o'$ is greater than the reference value, then the comparator 410 concludes that the sampled voltage represents a digital 1. In such a case, the comparator 410 provides a digital 1 as the output bit $x_o$. If $y_o'$ is less than the reference value, then the comparator 410 concludes that the sampled voltage represents a digital 0. In such a case, the comparator 410 outputs a digital 0 as the output bit $x_o$. After the output bit $x_o$ is generated by the comparator 410, it is provided to one or more consumers (not shown) to be consumed. It is also provided to a shift register 408, as will be discussed further below.

As noted above, it is the CV storage 308 that provides the compensation value to the compensator 404. In one embodiment, the CV storage 308 stores a plurality of four bit compensation values (if so desired, a compensation value may have fewer or more bits). Each compensation value corresponds to a particular combination of history bits. In one embodiment, the compensation values are stored in locations of the CV storage 308 that correspond to the particular combinations of history bits. For example, the compensation value for history bit combination 10010 is stored in location 10010 of the CV storage 308. This makes the compensation values easy to access based upon the history bits. For purposes of the present invention, the CV storage 308 may be implemented using any type of desired storage (e.g. memory, random access memory, flash memory, EEPROM, magnetic media, etc.).

Which compensation value is provided by the CV storage 308 to the compensator 404 is determined by a set of address bits provided by a shift register 408. In one embodiment, the shift register 408 stores an m number of bits that reflect the last m bits received by the receiver 302. The shift register 408 is updated each time a bit is received. Specifically, each time the comparator 410 determines that a currently received analog signal represents a digital 1 or a digital 0, the digital output bit $x_o$ of the comparator 410 is provided to the shift register 408. In response, the shift register 408 shifts in this new bit and shifts out the oldest bit (for purposes of the present invention, the new bit may be shifted into the most significant bit position or the least significant bit location). In this manner, the shift register 408 keeps track of the last m bits (the history bits) received by the receiver 302. These m bits are provided as address bits to the CV storage 308 to enable the CV storage 308 to access and provide the proper compensation value to the compensator 404. In one embodiment, m is 5 so that the shift register 408 maintains the last five history bits received by the receiver 302 (with m=5, the CV storage 308 would have $2^5$ or 32 locations, with each location corresponding to a particular combination of history bits). For purposes of the present invention, m may be any desired integer. Larger m values enable more history bits to be taken into account, and hence, enable the compensation values to be more precise. On the flip side, larger m values require the CV storage 308 to be larger. Thus, there is a tradeoff between precision and storage size.

In one embodiment, each receiver 302 further comprises an error generator 412. It is the error generator 412 that generates and provides error information to the adaptation unit 306 (FIG. 3) to enable the adaptation unit 306 to determine whether compensation values should be updated. More specifically, each time a compensation value corresponding to a particular combination of history bits is used, the error generator 412 determines whether that compensation value should be increased or decreased. Information (referred to as error information) pertaining to this determination is provided to the adaptation unit 306. As will be explained further in a later section, the adaptation unit 306 accumulates this error information and uses it to determine whether the compensation value should be adjusted.

To determine whether a compensation value should be increased or decreased, the error generator 412, in one embodiment, takes into account several factors, including the digital value $y_o$ provided by the ADC 402, the current compensation value CV (this value is provided by the CV storage 308, and is the same value as that provided to the compensator 404), and the output bit $x_o$ provided by the comparator 410. The following section discusses how these values may be used by the error generator 412.

Ideally, when the compensation value CV is subtracted from the digital value $y_o$, the result should be a positive or negative h0 (where h0 is the digital representation of the first and largest "hump" in the pulse responses of FIGS. 1 and 2). Put another way, by subtracting CV (which represents an approximation of the effects of previous sent pulses) from $y_o$ (which represents the currently sampled analog signal), the effects of previously sent pulses are removed from the currently received signal. Thus, all that should be left is a positive or negative h0 (which represents the signal caused by just the currently received pulse). Expressed in equation form, this would be:

$$y_o - CV(\text{ideal}) = x_o * h0;$$

where $x_o$ is a +1 if $x_o$ is a digital 1, and $x_o$ is a −1 if $x_o$ is a digital 0.

Solving for CV (ideal) produces:

$$CV(\text{ideal}) = y_o - x_o * h0.$$

$Y_o$ is provided by the ADC 402, $x_o$ is provided by the comparator 410, and h0 is a constant digital value that can be calibrated and set. Thus, the error generator 412 has everything that it needs to calculate the ideal CV. After calculating the ideal CV, the error generator 412 compares the ideal CV with the CV provided by the CV storage 308. If the ideal CV is higher than the CV provided by the CV storage 308, then the error generator 412 generates an error output that indicates that the CV should be increased. If the ideal CV is lower than the CV provided by the CV storage 308, then the error generator 412 generates an error output that indicates that the CV should be decreased. In one embodiment, the error output is a two bit value. One of the bits may be used as a sign bit to indicate whether the CV should be increased or decreased. The other bit may be used to indicate whether the CV should be increased/decreased by a small amount or a large amount. For example, if the magnitude of the difference between the ideal CV and the CV provided by the CV storage 308 is above a certain threshold, then the error generator 412 may indicate that the CV should be increased/decreased by a large amount. While two bits are used in the present embodiment, it should be noted that the error information provided by the error generator 412 may comprise any number of bits of information. The more bits that are used, the more precise the error information can be.

In one embodiment, the receiver 302 further comprises an adaptation interface 414. It is the adaptation interface 414 that enables the receiver 302 to interact with the adaptation unit 306 when the receiver 302 is coupled to the adaptation unit 306. In one embodiment, the adaptation interface 414 is coupled to the internal components of the receiver 302 via a set of address lines 420, a set of data/CV lines 422, a set of error lines 424, a read line 436, and a write line 438. The address lines 420 are coupled to the address lines of the CV storage 308 and the output lines of the shift register 408. In one embodiment, the address lines 420 are bi-directional so that they can receive address bits from the shift register 408, or provide address bits to the CV storage 308. The data/CV lines 422 are coupled to the data lines of the CV storage 308. In one embodiment, the data/CV lines 422 are also bi-directional so that they can be used to provide data (e.g. for write purposes) to the CV storage 308, or to receive data (e.g. for read purposes) from the CV storage 308. The error lines 424 are coupled to the output of the error generator 412. In one embodiment, the error lines 424 receive error information from the error generator 412. The read and write lines 436, 438 are coupled to the CV storage 308. Read line 436 is used to send a read signal to the CV storage 308 to read a compensation value from the storage. Write line 438 is used to send a write signal to the CV storage 308 to write an updated compensation value to the storage.

The adaptation interface 414 further comprises a plurality of lines for coupling to the interconnect 304 (FIG. 3) and hence the adaptation unit 306. These lines include a set of address lines 426, a set of data/CV lines 428, a set of error lines 430, a copy line 432, and an update line 434. In one embodiment, the address lines 426 are bi-directional lines that can be used to send address bits to and receive address bits from the adaptation unit 306. The data/CV lines 428 are bi-directional lines that can be used to provide data (e.g. compensation values) to and receive data (e.g. updated compensation values) from the adaptation unit 306. The error lines 430 are used to provide error information to the adaptation unit 306. The copy line 432 is used to receive a copy signal from the adaptation unit 306. As will be discussed later, the adaptation unit 306 may send a copy signal to the adaptation interface 414 when the adaptation unit 306 wishes to copy all of the compensation values stored in the CV storage 308. The update line 434 is used to receive an update signal from the adaptation unit 306. As will be discussed later, the adaptation unit 306 may send an update signal to the adaptation interface 414 when the adaptation unit 306 wishes to provide an updated compensation value for a certain combination of history bits.

In one embodiment, the adaptation interface 414 performs three main functions. First, it receives address bits (which are the same as the history bits) from the shift register 408 and error information from the error generator 412, and provides these to the adaptation unit 306. Recall that the error information from the error generator 412 indicates whether the compensation value corresponding to the current combination of history bits should be increased or decreased. Thus, this address and error information tells the adaptation unit 306 whether the compensation value corresponding to the set of address/history bits should be increased or decreased.

Second, the adaptation interface 414 receives updated compensation values from the adaptation unit 306, and updates the CV storage 308 with these compensation values. More specifically, when the adaptation unit 306 wishes to update a compensation value, it sends an update signal, a set of address/history bits, and an updated compensation value to the adaptation interface 414. This set of information indicates to the adaptation interface 414 that the compensation value corresponding to the set of address/history bits should be updated with the updated compensation value. In response, the adaptation interface 414 causes the updated compensation value to be written into the CV storage 308 at the location indicated by the address/history bits, thereby updating the CV storage 308 with the updated compensation value.

A third function that may be performed by the adaptation interface 414 is a copy function. When the adaptation unit 306 is coupled to the receiver, the adaptation unit 306 may wish to copy all of the compensation values that are currently stored in CV storage 308. The adaptation unit 306 indicates this desire by sending a copy signal to the adaptation interface 414. In response, the adaptation interface 414 generates each possible address for the CV storage 308, applies that address to the storage 308, reads the compensation value stored at that address, and provides that compensation value (along with corresponding address) to the adaptation unit 306. This will enable the adaptation unit 306 to copy all of the compensation values currently stored in the CV storage 308.

In one embodiment, the compensator 404, comparator 410, error generator 412, and adaptation interface 414 of the receiver 302 are implemented using hardware components. More specifically, the logical, arithmetic, coordination, and other functions performed by these components are realized using hardwired, hardware elements that implement logical, arithmetic, shifting, comparing, and other low level functions. These elements may include, for example, logic gates (e.g. AND, OR, XOR, etc.), arithmetic units, shift registers, latches, registers, flip-flops, clock control circuits, incrementing/decrementing circuits, etc. Implementing these components with hardwired, hardware elements enables the components to operate very quickly.

Adaptation Unit

FIG. 4 shows an adaptation unit 306 in accordance with one embodiment of the present invention. As shown, the adaptation unit 306 comprises an adaptation manager 502, a CV storage 504, and an accumulation storage 506. As will be discussed further below, it is the adaptation manager 502 that controls and manages the interaction with a currently coupled receiver. In performing its functions, the adaptation manager 502 will access and make use of the CV storage 504 and the accumulation storage 506.

Figure 5:
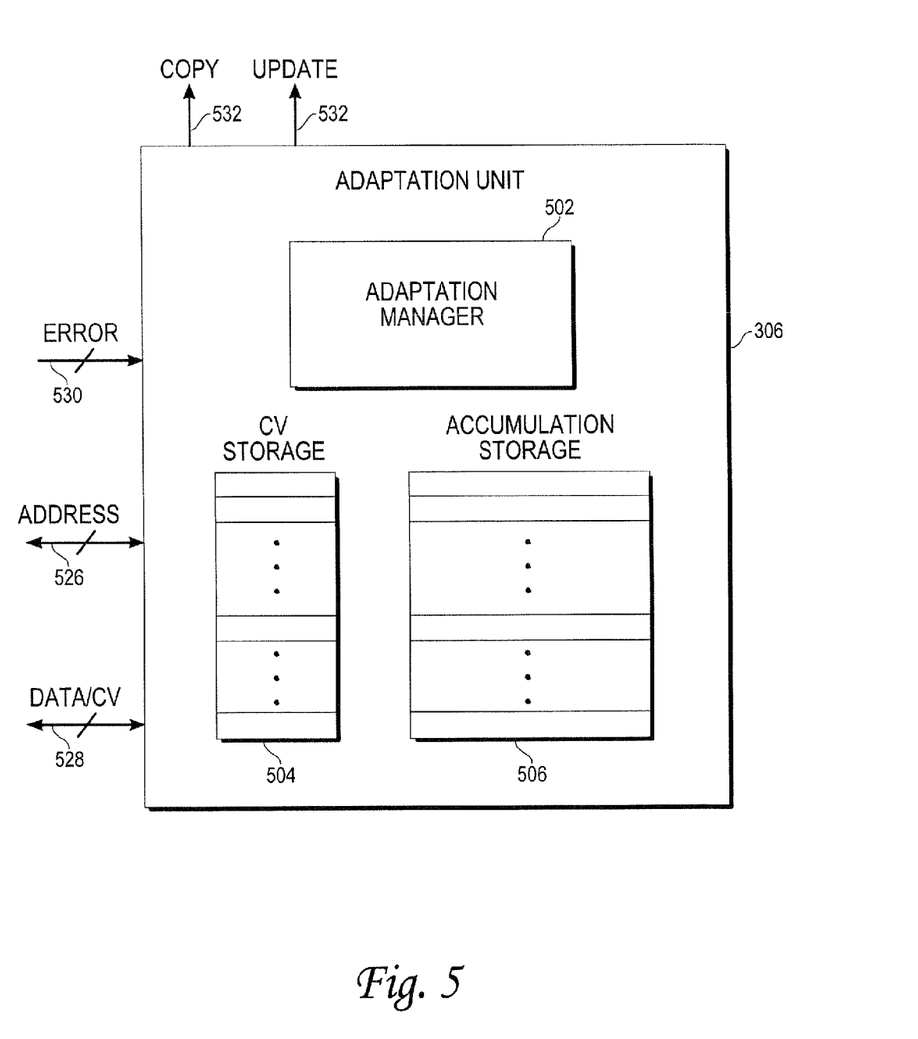
FIG. 5 shows an adaptation unit, in accordance with one embodiment of the present invention.

In one embodiment, the CV storage 504 has the same capacity and the same configuration as the CV storages 308 on the receivers 302. As noted previously, in one embodiment, each of the receiver CV storages 308 has $2^5$ or 32 locations, with each location storing four bits; thus, in one embodiment, CV storage 504 also has 32 locations, with each location storing four bits (if the capacity and configuration of the receiver CV storages 308 change, the capacity and configuration of CV storage 504 may likewise change). Each location in the CV storage 504 is used to store a compensation value. Each compensation value corresponds to a particular combination of address/history bits (hereinafter, history bits for the sake of brevity). In one embodiment, the compensation values are stored in locations of the CV storage 504 that correspond to the particular combinations of history bits. For example, the compensation value for history bit combination 10010 is stored in location 10010 of the CV storage 504. This makes the compensation values easy to access based upon the history bits.

In one embodiment, the accumulation storage 506 has the same number of locations as the CV storage 504, however, each location stores eight bits rather than four (if so desired, each location may store more or fewer than eight bits). Each location in the accumulation storage 506 is used to store an accumulation value. Each accumulation value corresponds to a particular combination of history bits. In one embodiment, the accumulation values are stored in locations of the accumulation storage 506 that correspond to the particular combinations of history bits. For example, the accumulation value for history bit combination 10010 is stored in location 10010 of the accumulation storage 506. This makes the accumulation values easy to access based upon the history bits. Since each accumulation value corresponds to a particular combination of history bits, and since each compensation value also corresponds to a particular combination of history bits, this means that each combination of history bits has a corresponding accumulation value and a corresponding compensation value. This in turn means that, through the combination of history bits, each accumulation value is associated with a corresponding compensation value, and vice versa (e.g. the accumulation value for history bit combination 10010 is associated with the compensation value for history bit combination 10010). The significance of the accumulation values will be elaborated upon in a later section.

In the example shown in FIG. 5, the CV storage 504 and the accumulation storage 506 are implemented as separate storages. If so desired, the two storages 504, 506 may be implemented as a single storage (e.g. each location of the single storage may store twelve bits, with the first four bits representing the compensation value and the remaining eight bits representing the accumulation value). These and other implementations are within the scope of the present invention. For purposes of the present invention, storages 504, 506 may be implemented using any type of desired storage (e.g. memory, random access memory, flash memory, EEPROM, magnetic media, etc.).

To enable it to communicate with a currently coupled receiver, the adaptation unit 306 is coupled to the interconnect 304 via a plurality of sets of lines. In one embodiment, these lines include a set of address lines 526, a set of data/CV lines 528, a set of error lines 530, a copy line 532, and an update line 534. In one embodiment, the address lines 526 are bi-directional lines that can be used to send history bits to and receive history bits from the currently coupled receiver. The data/CV lines 528 are bi-directional lines that can be used to provide data (e.g. updated compensation values) to and receive data (e.g. compensation values) from the currently coupled receiver. The error lines 530 are used to receive error information from the currently coupled receiver. The copy line 532 is used to send a copy signal to the currently coupled receiver. The adaptation unit 306 may send such a copy signal when the adaptation unit 306 wishes to copy all of the compensation values currently stored in the CV storage 308 of the currently coupled receiver. The update line 534 is used to send an update signal to the currently coupled receiver. The adaptation unit 306 may send such an update signal when the adaptation unit 306 wants the currently coupled receiver to update a compensation value corresponding to a certain combination of history bits to an updated compensation value.

As mentioned previously, it is the adaptation manager 502 that manages and controls the interaction with a currently coupled receiver. In one embodiment, in carrying out this management and control function, the adaptation manager 502 performs three main functions.

A first function performed by the adaptation manager 502 is to receive error information from the currently coupled receiver, and to maintain the accumulation values in the accumulation storage 506 and the compensation values in the CV storage 504 accordingly. More specifically, the adaptation manager 502 receives a plurality of sets of error information from the currently coupled receiver. Each set of error information corresponds to a particular combination of history bits, and each set of error information indicates whether the compensation value corresponding to that particular combination of history bits should be increased or decreased (the error information is received on lines 530 and the history bits are received on lines 526). When the adaptation manager 502 receives a set of error information (and its corresponding history bits), the adaptation manager 502 uses the history bits to access a location in the accumulation storage 506 that corresponds to the set of history bits. The adaptation manager 506 then determines, based upon the error information, whether to increase or decrease the accumulation value stored in that location of the accumulation storage 506. Recall that, in one embodiment, the error information includes a sign bit indicating whether the compensation value should be increased or decreased, and another bit indicating how much the compensation value should be increased or decreased. Based upon this information, the adaptation manager 502 increases or decreases the accumulation value by a certain amount (the amount may be determined based upon the non-sign bit). Notice that it is the accumulation value in the accumulation storage 506, not the compensation value in the CV storage 504, that is increased or decreased in response to a set of error information. Thus, even though the error information indicates whether the compensation value should be increased or decreased, the adaptation manager 502 does not necessarily increase or decrease the compensation value in response to a set of error information. In effect, the adaptation manager 502 treats each set of error information as a "vote" to increase or decrease the compensation value corresponding to the particular combination of history bits. Only if there are enough votes to increase or decrease the compensation value will the adaptation manager 502 actually increase or decrease the compensation value. In a sense, the accumulation value corresponding to a particular combination of history bits can be viewed as an accumulation of all of the votes to increase or decrease the compensation value corresponding to that particular combination of history bits.

After the adaptation manager 502 has increased or decreased the accumulation value, it checks the updated accumulation value to determine whether the updated accumulation value has reached a threshold. In one embodiment, an accumulation value can reach one of two thresholds: an increase threshold or a decrease threshold. The increase threshold (which may, for example, be the eight bit value 11111111) tells the adaptation manager 502 that the compensation value corresponding to the particular combination of history bits should be increased (e.g. incremented). The decrease threshold (which may, for example, be the eight bit value 00000000) tells the adaptation manager 502 that the compensation value corresponding to the particular combination of history bits should be decreased (e.g. decremented). If one of these thresholds is reached, thereby indicating that enough votes have been accumulated to justify increasing or decreasing the compensation value, then the adaptation manager 502 will actually adjust (increase or decrease) the compensation value corresponding to the particular combination of history bits. In one embodiment, the adaptation manager 502 does so by using the history bits to access a corresponding location in the CV storage 504. The adaptation manager 502 then increases or decreases the compensation value stored in that location (the compensation value may be increased or decreased by any desired amount). In addition to adjusting the compensation value, the adaptation manager 502 also resets the accumulation value that has reached one of the thresholds. In one embodiment, the accumulation value is reset to a value that is between the two thresholds (e.g. the eight bit value 10000000).

Another function performed by the adaptation manager 502 is to instruct the currently coupled receiver to update a compensation value corresponding to a particular combination of history bits. The adaptation manager 502 may do so after it has adjusted (in the manner described above) one of the compensation values stored in the CV storage 504. To instruct the currently coupled receiver to update a compensation value, the adaptation manager 502 sends an update signal on line 534. It also sends an updated compensation value on lines 528 and a corresponding set of history bits on lines 526. With these sets of information, the currently coupled receiver will be able to update the proper compensation value stored in the proper location of its CV storage 308 with the proper updated compensation value.

Yet another function that may be performed by the adaptation manager 502 is to copy all of the compensation values currently stored in the CV storage 308 of the currently coupled receiver into the CV storage 504. The adaptation manager 502 may do so, for example, whenever the adaptation unit 306 is changed from being coupled to one receiver to being coupled to another receiver. To initiate a copy operation, the adaptation manager, in one embodiment, sends a copy signal on line 532. In response to this signal, the currently coupled receiver will provide a series of history bits and corresponding compensation values. The history bits will be received on lines 526 and the compensation values will be received on lines 528. In response to each set of history bits and corresponding compensation value, the adaptation manager 502 accesses the location of the CV storage 504 corresponding to the history bits, and stores the received compensation value therein. At the end of this process, all of the compensation values currently stored in the CV storage 308 of the currently coupled receiver will have been copied into the CV storage 504 of the adaptation unit 306.

The above discussion describes some of the major functions performed by the adaptation manager 502, in accordance with one embodiment of the present invention. These and other functions may be performed by the adaptation manager 502 within the scope of the present invention.

In one embodiment, the adaptation manager 502 is implemented using hardware components. More specifically, the logical, arithmetic, coordination, and other functions performed by the adaptation manager are realized using hardwired, hardware elements that implement logical, arithmetic, shifting, comparing, and other low level functions. These elements may include, for example, logic gates (e.g. AND, OR, XOR, etc.), arithmetic units, shift registers, latches, registers, flip-flops, clock control circuits, incrementing/decrementing circuits, etc. Implementing these components with hardwired, hardware elements enables the components to operate very quickly. As an alternative, the functions performed by adaptation manager 502 may be realized by having one or more processors execute one or more sets of software. These and other implementations are within the scope of the present invention.

Sample Operation

With reference to FIGS. 2-5, a sample operation of the apparatus 300 will now be described. Suppose that the apparatus 300 is implemented on an IC and that the IC is being powered up or reset. At startup, the apparatus 300 enters an initialization phase. In this phase, the interconnect 304, in one embodiment, operates in broadcast mode (the significance of this will be made clear in a later section).

To begin initialization, the interconnect 304 selects one of the receivers 302 and couples the adaptation unit 306 to that receiver 302. For the sake of example, it will be assumed that the selected receiver is receiver 302(1); thus, receiver 302(1) becomes the currently coupled receiver. After coupling receiver 302(1) to the adaptation unit 306, the interconnect 304 informs the adaptation manager 502 that the adaptation unit 306 has been coupled to a new receiver. Given this information, the adaptation manager 502 knows that it is working with a newly coupled receiver; thus, in one embodiment, the adaptation manager 502 proceeds to copy the compensation values stored in the CV storage 308(1) of the currently coupled receiver 302(1) into the CV storage 504 of the adaptation unit 306. In one embodiment, the adaptation manager 502 initiates the copy process by sending a copy signal on line 532. This signal is relayed by the interconnect 304 to the currently coupled receiver 302(1), and the adaptation interface 414 of the receiver 302(1) receives the copy signal on line 432.

Given the copy signal, the adaptation interface 414 knows that it should access the CV storage 308(1) and provide all of the compensation values currently stored in the CV storage 308(1) to the adaptation unit 306 (in one embodiment, at startup, each of the CV storages 308 contains random compensation values). To implement the copy process, the adaptation interface 414 generates an address. In the current example, the address is a five bit address, and may be the first address (e.g. 00000) in the CV storage 308(1). The adaptation interface 414 sends this address (on lines 420) and a read signal (on line 436) to the CV storage 308(1). In response, the CV storage 308(1) outputs (on lines 422) the compensation value stored at that address. Thereafter, the adaptation interface 414 sends the address (on lines 426) and the compensation value (on lines 428) to the interconnect 304 to be relayed to the adaptation unit 306. After that, the adaptation interface 414 generates another address (e.g. 00001), and repeats the above process to read another compensation value from the CV storage 308(1), and provide that compensation value and corresponding address to the adaptation unit 306. The adaptation interface 414 repeats this process until all of the compensation values stored in the CV storage 308(1) have been provided to the adaptation unit 306.

On the adaptation unit end, the adaptation manager 502 receives each address (on lines 526) and each corresponding compensation value (on lines 528). In response to each set of information (address and corresponding compensation value), the adaptation manager 502 accesses the location of the CV storage 504 indicated by the address, and writes the corresponding compensation value into that location. By repeating this process for each address and compensation value that is received from the receiver 302(1), the adaptation manager 502 will ensure that the CV storage 504 contains a copy of all of the compensation values currently stored in the receiver CV storage 308(1). In addition to populating the CV storage 504 with values, the adaptation manager 502, in one embodiment, also initializes the accumulation storage 506 with values. In one embodiment, the adaptation manager 502 initializes each value in the accumulation storage 506 to a middle value (e.g. 10000000). With the storages 504, 506 so initialized, the adaptation manager 502 is ready to interact with the currently coupled receiver 302(1) to perform its compensation value adjustment function.

At some point, the receiver 302(1) begins receiving analog signals on its communications link. During each time interval, the analog signal on the communications link is sampled to obtain a sampled analog signal, and the ADC 402 converts this sampled analog signal into a digital value $y_o$. The digital value $y_o$ is provided to the compensator 404. The compensator 404 also receives a compensation value (CV) from the CV storage 308(1). The compensation value received from the CV storage 308(1) corresponds to a particular combination of history bits, which are provided by the shift register 408 as address bits to the CV storage 308(1) (in one embodiment, at startup, the shift register 408 may be initialized to a default value or it may have a random value). Given the address bits, the CV storage 308(1) accesses the appropriate location, and provides the compensation value stored in that location.

Given the digital value $y_o$ and the compensation value, the compensator 404, in one embodiment, subtracts the compensation value from the digital value $y_o$ to derive a compensated value $y_o'$, which is provided to the comparator 410. The comparator 410 compares the compensated value $y_o'$ with a reference value, and if the compensated value $y_o'$ is less than the reference value, then the comparator 404 outputs a digital 0 as the output bit $x_o$ (thereby indicating that the sampled analog signal represents a digital 0). If the compensated value $y_o'$ is greater than the reference value, then the comparator 404 outputs a digital 1 as the output bit $x_o$ (thereby indicating that the sampled analog signal represents a digital 1). After the output bit $x_o$ is generated, it is provided to the shift register 408. The shift register 408 shifts this bit in and shifts the oldest bit in the shift register 408 out, thereby updating the history bits stored in the shift register 408. This updated set of history bits will be provided to the CV storage 308(1) in the next time interval to access the proper compensation value for the next sampled analog signal.

In addition to determining whether the sampled analog signal represents a digital 1 or a digital 0, the receiver 302(1) also determines whether the compensation value that was just used by the compensator 404 to derive the compensated value $y_o'$ should be adjusted. This determination is made by the error generator 412. In one embodiment, the error generator 412 uses the digital value $y_o$, the compensation value that was just used by the compensator 404, and the output bit $x_o$ to generate a set of error information (this error information may be derived by the error generator 412 in the manner described previously). The error information indicates whether the compensation value that was just used by the compensator 404 to derive the compensated value $y_o'$ should be increased or decreased. This error information is provided (on lines 424) to the adaptation interface 414. Also provided to the adaptation interface 414 is the set of history bits that correspond to the compensation value that was just used by the compensator 404 to derive the compensated value $y_o'$. This set of history bits is provided (on lines 420) to the adaptation interface 414 by the shift register 408 (these history bits are the history bits that were stored in the shift register 408 before the shift register 408 shifted in the new output bit $x_o$). Upon receiving the error information and the corresponding history bits, the adaptation interface 414 forwards the error information and history bits (on lines 430 and 426, respectively) to the interconnect 304 to be relayed to the adaptation unit 306.

The above example shows how one set of error information and corresponding history bits may be provided to the adaptation unit 306. During the time that it is coupled to the adaptation unit 306, the receiver 302(1) will process many analog signals, and the error generator 412 will generate many sets of error information, with each set of error information corresponding to a particular combination or set of history bits. Each set of error information, and its corresponding set of history bits, will be provided to the adaptation interface 414, and the adaptation interface 414 will, in turn, provide the error information and the corresponding history bits to the adaptation unit 306. Thus, the adaptation unit 306 will be provided with a large number of sets of error information. Over time, it is likely that many sets of error information will be provided for each possible combination of history hits. Each of these sets of error information will act as a vote to increase or decrease the compensation value associated with the corresponding set of history bits.

On the adaptation unit end, the adaptation manager 502 receives each set of error information (on lines 530) and each corresponding set of history bits (on lines 526). When the adaptation manager 502 receives a set of error information and its corresponding history bits, it uses the history bits to access a corresponding location in the accumulation storage 506. Then, based upon the set of error information, the adaptation manager 502 determines whether to increase or decrease the accumulation value stored in that location. Recall that, in one embodiment, the error information includes a sign bit indicating whether the compensation value should be increased or decreased, and another bit indicating how much the compensation value should be increased or decreased. Based upon the sign bit, the adaptation manager 502 determines whether to increase or decrease the accumulation value. Based upon the other bit, the adaptation manager 502 determines by how much the accumulation value should be increased or decreased (e.g. the adaptation manager 502 may increment the accumulation value by a small amount or a larger amount). In accordance with the error information, the adaptation manager 502 increases or decreases the accumulation value by a certain amount to derive an updated accumulation value.

Thereafter, the adaptation manager 502 checks the updated accumulation value to determine whether it has reached or crossed either an increase threshold or a decrease threshold. If the updated accumulation value has not reached or crossed either threshold, then the adaptation manager 502 simply proceeds to process the next set of error information and corresponding history bits.

However, if the updated accumulation value has reached or crossed one of the thresholds, then the adaptation manager 502 will reset the accumulation value to a middle value (e.g. 10000000). In addition, the adaptation manager 502 will proceed to adjust the compensation value corresponding to the history bits. Specifically, if the updated accumulation value has reached an increase threshold (which, for example, may be the eight bit value 11111111), thereby indicating that enough "increase votes" have been accumulated to justify increasing the compensation value corresponding to the history bits, then the adaptation manager 502 will increase the compensation value. On the other hand, if the updated accumulation value has reached a decrease threshold (which, for example, may be the eight bit value 00000000), thereby indicating that enough "decrease votes" have been accumulated to justify decreasing the compensation value, then the adaptation manager 502 will decrease the compensation value.

In one embodiment, the adaptation manager 502 adjusts the compensation value by using the history bits received with the set of error information to access a corresponding location in the CV storage 504. The adaptation manager 502 then increases or decreases (depending upon whether an increase threshold or a decrease threshold was reached or crossed) the compensation value stored in that location. The adaptation manager 502 may increase or decrease the compensation value by any desired amount. An updated compensation value is thus derived.

In one embodiment, when the adaptation manager 502 updates a compensation value in the CV storage 504, it also instructs the currently coupled receiver 302(1) to update that compensation value in the receiver CV storage 308(1) as well. In one embodiment, the adaptation manager 502 does so by sending an update signal on line 532. It also provides the updated compensation value on lines 528 and the corresponding history bits (the history bits received with the error information) on lines 526. These sets of information are relayed by the interconnect 304 to the currently coupled receiver 302(1), and the adaptation interface 414 of the currently coupled receiver 302(1) receives the update signal on line 434, the updated compensation value on lines 428, and the history bits on lines 426. Given the update signal, the adaptation interface 414 knows that it should update the CV storage 308(1) with an updated compensation value. To do so, the adaptation interface 414 takes the history bits received on lines 426 and puts them onto lines 420. In addition, it places the updated compensation value received on lines 428 onto lines 422. Furthermore, the adaptation interface 414 sends a write signal on line 438.

The write signal, the history bits, and the updated compensation value are received by the CV storage 308(1). In response, the CV storage 308(1) accesses the location indicated by the history bits, and stores the updated compensation value into that location. The compensation value corresponding to the history bits is thus updated with the updated compensation value. In the manner described, the receiver 302(1) and adaptation unit 306 interact to adjust and update a compensation value stored in the receiver CV storage 308(1). During the time that the receiver 302(1) is coupled to the adaptation unit 306, most if not all of the compensation values stored in CV storage 308(1) will be adjusted and updated in this manner. In fact, most if not all of the compensation values will be adjusted and updated many times. Assuming that the receiver 302(1) is coupled to the adaptation unit 306 for a sufficient amount of time, the compensation values stored in the CV storage 308(1) will converge to a stable set of values. At that point, the compensation values will be customized for the communications link to which the receiver 302(1) is coupled.

As noted previously, during the initialization phase, the interconnect 304 in one embodiment operates in broadcast mode. Thus, when the interconnect 304 detects the update signal on line 532, the history bits on lines 526, and the updated compensation value on lines 528, it does not forward this information to just the currently coupled receiver 302(1); rather, the interconnect 304 broadcasts the information to all of the other receivers as well. In response, each of the adaptation interfaces 414 of each of the receivers 302 will operate in the manner described above for the adaptation interface 414 of receiver 302(1) to cause the updated compensation value to be stored into the CV storage 308 of each receiver at the location indicated by the history bits. In this manner, all of the receivers are updated with the same updated compensation value as the initially coupled receiver 302(1). Doing this for each update will cause all of the CV storages 308 of all of the receivers 302 to have the same compensation values as the CV storage 308(1) of receiver 302(1). In this manner, during the initialization phase, all of the CV storages 308 are initialized concurrently.

At some point, the interconnect 304 will decide that it is time to couple the adaptation unit 306 to another receiver 302. The interconnect 304 may decide to do this, for example, when a certain time period has expired. Alternatively, the interconnect 304 may do this in response to an instruction from the adaptation manager 502. For example, the adaptation manager 502 may determine that it has not adjusted a compensation value for a certain period of time (thereby indicating that the set of compensation values have converged). In response to such a determination, the adaptation manager 502 may instruct the interconnect 304 to couple it to another receiver 302.

When the interconnect 304 decides to couple the adaptation unit 306 to another receiver 302, it selects a different receiver (using any desired selection and sharing scheme) and couples the adaptation unit 306 to that receiver. The interconnect 304 also informs the adaptation manager 502 that the adaptation unit 306 has been coupled to a new receiver. Furthermore, the interconnect 304 stops operating in broadcast mode. Since all of the receivers 302 have been initialized, there is longer any need to operate in broadcast mode.

Upon learning that the adaptation unit 306 has been coupled to another receiver, the adaptation manager 502 interacts with the newly coupled receiver to copy all of the compensation values stored in the CV storage of that receiver into the CV storage 504 of the adaptation unit 306 (this copy process may be carried out in the manner described previously). The adaptation manager 502 also resets all of the accumulation values in the accumulation storage to a middle value (e.g. 10000000). Thereafter, the adaptation manager 502 interacts with the newly coupled receiver to adjust and update the compensation values stored in the CV storage 308 of that receiver to customize the compensation values for the communications link to which that receiver is coupled (this may be done in the manner described previously).

At some point, the interconnect 304 will decide again that it is time to couple the adaptation unit 306 to another receiver 302. At that point, the interconnect 304 will select another receiver 302, and the above process will be repeated. In one embodiment, the interconnect 304 will eventually couple the adaptation unit 306 to each and every one of the receivers 302 to allow the adaptation unit 306 to customize the compensation values stored by each receiver for the communications link to which that receiver is coupled.

In one embodiment, the interconnect 304 couples the adaptation unit 306 to each of the receivers 302 in turn, and after every receiver 302 has been coupled to the adaptation unit 306, the interconnect 304 couples the adaptation unit 306 to the first receiver again and repeats the rotation. Doing so affords the adaptation unit 306 the opportunity to regularly adjust the compensation values stored by each receiver 302. Over time, the performance of the communications links may change (e.g. due to temperature changes, voltage changes, humidity changes, etc.). Allowing the adaptation unit 306 to regularly adjust the compensation values stored by each receiver 302 enables the receivers 302 to adapt to these changes.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. An apparatus, comprising:
   an n number of receivers, where n is an integer greater than one, and where each of the receivers is coupled to a separate communications link;
   a shared adaptation unit (SAU); and
   an interconnect for selectively coupling the SAU to each of the n receivers to enable the SAU to be shared by the n receivers, wherein a receiver becomes a currently coupled receiver when the interconnect couples the SAU to that receiver, and wherein each of the n receivers at some point will become a currently coupled receiver;
   wherein each receiver comprises:
      a receiver storage for storing a plurality of compensation values, wherein each compensation value corresponds to a particular combination of digital history bits, and wherein each compensation value indicates an effect that a particular combination of digital history bits has on a currently received signal; and
   wherein the SAU comprises:
      an adaptation manager configured to interact with a currently coupled receiver to adjust the plurality of compensation values stored by the currently coupled receiver to customize the plurality of compensation values stored by the currently coupled receiver for the communications link to which the currently coupled receiver is coupled.

2. The apparatus of claim 1, wherein the adaptation manager comprises:
   a mechanism for sending an instruction, via the interconnect, to the currently coupled receiver to cause the currently coupled receiver to update a certain compensation value corresponding to a certain combination of digital history bits to a new compensation value.

3. The apparatus of claim 2, wherein the interconnect, during an initialization phase, broadcasts the instruction to all of the other receivers not currently coupled to the SAU to cause each of the other receivers to update the certain compensation value stored by that receiver corresponding to the certain combination of digital history bits to the new compensation value, thereby causing all of the other receivers to be initialized such that they have the same compensation value corresponding to the certain combination of digital history bits as the currently coupled receiver.

4. The apparatus of claim 1, wherein the SAU further comprises:
   an SAU storage for storing a copy of the plurality of compensation values stored by the currently coupled receiver.

5. The apparatus of claim 1, wherein each receiver further comprises:
   an error generator for generating a plurality of sets of error information, wherein each set of error information relates to a specific compensation value stored by that receiver corresponding to a specific combination of digital history bits, and indicates whether that specific compensation value corresponding to that specific combination of digital history bits should be adjusted higher or lower; and
   an adaptation interface for providing the plurality of sets of error information to the interconnect to be relayed to the SAU.

6. The apparatus of claim 5, wherein the SAU further comprises an accumulation storage for storing a plurality of accumulation values, and wherein the adaptation manager comprises:
   a mechanism for receiving a plurality of sets of error information provided by the currently coupled receiver;
   a mechanism for accumulating information from the plurality of sets of error information provided by the currently coupled receiver in the accumulation storage, wherein each accumulation value in the accumulation storage corresponds to a particular combination of digital history bits; and
   a mechanism for determining, based upon the accumulation values, whether sufficient justification exists to adjust one or more of the plurality of compensation values stored by the currently coupled receiver corresponding to one or more combinations of digital history bits.

7. The apparatus of claim 5, wherein the SAU further comprises an accumulation storage for storing a plurality of accumulation values, and wherein the adaptation manager comprises:
   a mechanism for receiving multiple sets of error information provided by the currently coupled receiver relating to a first compensation value corresponding to a first combination of digital history bits;

a mechanism for accumulating information from the multiple sets of error information to derive an accumulation value, wherein the accumulation value is stored in the accumulation storage;

a mechanism for determining whether the accumulation value has reached an update threshold; and a mechanism for concluding, in response to a determination that the accumulation value has reached an update threshold, that the first compensation value corresponding to the first combination of digital history bits should be adjusted.

8. The apparatus of claim 7, wherein the mechanism for determining whether the accumulation value has reached an update threshold comprises:

a mechanism for determining whether the accumulation value has reached an increase threshold or a decrease threshold.

9. The apparatus of claim 8, wherein the mechanism for concluding comprises:

a mechanism for concluding, in response to a determination that an increase threshold has been reached, that the first compensation value corresponding to the first combination of digital history bits should be increased; and a mechanism for concluding, in response to a determination that a decrease threshold has been reached, that the first compensation value corresponding to the first combination of digital history bits should be decreased.

10. The apparatus of claim 9, wherein the adaptation manager further comprises:

a mechanism for instructing the currently coupled receiver to update the first compensation value corresponding to the first combination of digital history bits to a higher compensation value, in response to a conclusion that the first compensation value corresponding to the first combination of digital history bits should be increased; and a mechanism for instructing the currently coupled receiver to update the first compensation value corresponding to the first combination of digital history bits to a lower compensation value, in response to a conclusion that the first compensation value corresponding to the first combination of digital history bits should be decreased.

11. The apparatus of claim 1, wherein each receiver further comprises:

an adaptation interface, configured to receive an instruction from the SAU to update a certain compensation value corresponding to a certain combination of digital history bits, and configured to update the certain compensation value stored by the receiver corresponding to the certain combination of digital history bits to a new compensation value.

12. The apparatus of claim 1, wherein the plurality of compensation values stored by each of the n receivers is different from receiver to receiver.

13. The apparatus of claim 1, wherein each receiver further comprises:

an analog-to-digital converter for converting an analog signal into a digital value representative of the analog signal;

a compensator for deriving, based at least partially upon the digital value and a specific compensation value corresponding to a specific combination of digital history bits, a compensated digital value; and a comparator for determining, based at least partially upon the compensated digital value, whether the analog signal represents a digital 1 or a digital 0.

14. The apparatus of claim 13, wherein the specific combination of digital history bits represents values of digital bits received by the receiver in previous time intervals.

15. The apparatus of claim 14, wherein each receiver further comprises:

an error generator configured to determine, based at least partially upon the digital value, the specific compensation value, and a reference value, whether the specific compensation value corresponding to the specific combination of digital history bits should be increased or decreased, and provide a set of error information, wherein the set of error information indicates whether the specific compensation value corresponding to the specific combination of digital history bits should be increased or decreased.

16. The apparatus of claim 15, wherein each receiver further comprises:

an adaptation interface, configured to receive an instruction from the SAU to update a certain compensation value corresponding to a certain combination of digital history bits, and configured to update the certain compensation value stored by the receiver corresponding to the certain combination of digital history bits to a new compensation value.

17. A method for enabling an adaptation unit to be shared among a plurality of receivers, comprising:

coupling an adaptation unit to a first receiver in a plurality of receivers, wherein the first receiver is coupled to a first communications link, wherein the first receiver stores a first plurality of compensation values, wherein each compensation value in the first plurality of compensation values corresponds to a particular combination of digital history bits, and wherein each compensation value in the first plurality of compensation values indicates an effect that a particular combination of digital history bits has on a signal currently received on the first communications link;

interacting, by the adaptation unit, with the first receiver to adjust the first plurality of compensation values to customize the first plurality of compensation values for the first communications link;

coupling the adaptation unit to a second receiver in the plurality of receivers, wherein the second receiver is coupled to a second communications link, wherein the second receiver stores a second plurality of compensation values, wherein each compensation value in the second plurality of compensation values corresponds to a particular combination of digital history bits, and wherein each compensation value in the second plurality of compensation values indicates an effect that a particular combination of digital bits has on a signal currently received on the second communications link; and interacting, by the adaptation unit, with the second receiver to adjust the second plurality of compensation values to customize the second plurality of compensation values for the second communications link.

18. The method of claim 17, further comprising:

after the adaptation unit is coupled to the first receiver:
receiving, by the adaptation unit from the first receiver, a copy of the first plurality of compensation values; and
storing, by the adaptation unit, the first plurality of compensation values;

after the adaptation unit is coupled to the second receiver:
receiving, by the adaptation unit from the second receiver, a copy of the second plurality of compensation values; and storing, by the adaptation unit, the second plurality of compensation values.

19. The method of claim 17, wherein interacting, by the adaptation unit, with the first receiver comprises:
receiving, by the adaptation unit, multiple sets of error information provided by the first receiver relating to a first compensation value corresponding to a first combination of digital history bits;
accumulating, by the adaptation unit, information from the multiple sets of error information to derive an accumulation value, wherein the accumulation value corresponds to the first combination of digital history bits;
determining, by the adaptation unit, whether the accumulation value has reached an update threshold;
in response to a determination that the accumulation value has reached an update threshold, sending, by the adaptation, an update instruction to the first receiver to cause the first receiver to update the first compensation value corresponding to the first combination of digital history bits to a new compensation value.

20. The method of claim 17, wherein interacting, by the adaptation unit, with the first receiver comprises:
during an initialization phase, broadcasting, by the adaptation unit, an update instruction to all of the receivers in the plurality of receivers, the update instruction causing all of the receivers to update a certain compensation value corresponding to a certain combination of digital history bits to a new compensation value, thereby causing all of the receivers to be initialized such that they have the same compensation value corresponding to the certain combination of digital history bits as the first receiver.

* * * * *